United States Patent Office 2,973,670
Patented Mar. 7, 1961

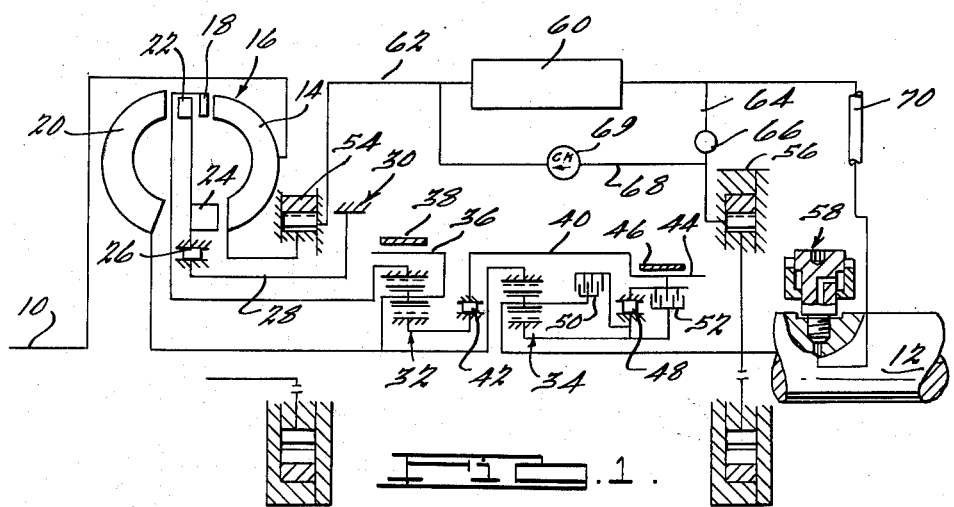

2,973,670

CENTRIFUGALLY OPERATED FLUID PRESSURE GOVERNOR

Robert O. Dameron, Detroit, Mich., assignor to Ford Motor Company, Dearborn, Mich., a corporation of Delaware Filed Sept. 13, 1957, Ser. No. 683,830

7 Claims. (Cl. 74—752)

My invention relates generally to a fluid pressure governor and more particularly to a speed sensitive, centrifugally operated, fluid pressure governor which is adapted to be used in a fluid pressure control circuit for an automatic power transmission mechanism.

My invention comprises an improvement in the governor assembly disclosed in the copending application of Michael A. DeCorte et al., Serial Number 683,793 which is assigned to the assignee of my instant invention. I contemplate that my improved governor assembly may be used in a variety of transmission mechanisms, one suitable transmission mechanism being disclosed in the copending application of James Knowles, Serial Number 616,878, which is also assigned to the assignee of my instant invention.

The gear elements of such a transmission are usually of the epicyclic type and the relative motion of the gear elements thereof is normally controlled by fluid pressure operated servo members. A fluid pressure control circuit is provided for regulating the operation of the various servo members whereby any one of several gear reduction ratios may be established. The elements of the control circuit are sensitive to various operating parameters to establish a suitable shift pattern thereby adapting the transmission mechanism for operation in the optimum gear ratio for any given driving condition.

The improved governor of my instant invention may form a portion of such a control circuit and it is capable of supplying a control pressure signal or governor pressure which is proportional in magnitude to the speed of the transmission tail shaft. This control signal may be transmitted through suitable conduit structure to pressure sensitive elements of the control circuit for actuating the same.

It is an object of my invention to provide a fluid pressure governor mechanism of the centrifugally operated type which is adapted to be secured to the transmission tail shaft and which requires a minimum amount of space within the transmission tail shaft housing.

It is another object of my invention to provide a fluid pressure governor of simplified construction which is adapted to cooperate with a tail shaft driven fluid pump to regulate the discharge pressure of the latter whereby the discharge pressure may be utilized as a source of speed sensitive pressure.

It is another object of my invention to provide a centrifugally operated fluid pressure governor which includes relatively movable, telescopically related valve portions adapted to be conveniently mounted on a transmission tail shaft and which may utilize a component of the transmission braking means for counter-balancing purposes.

It is another object of my invention to provide a simplified centrifugally operated fluid pressure governor adapted to be used in cooperation with the transmission tail shaft driven pump as above set forth and which includes a single exhaust orifice and a single fluid pressure passage interconnecting the discharge side of the pump and orifice.

It is a further object of my invention to provide a simplified fluid pressure speed governor which may be readily adapted to be used in control circuits for automatic power transmissions of various designs for supplying a speed sensitive governor pressure.

In carrying forth the foregoing objects I have provided a governor mechanism with two relatively movable valve portions, one of which may be fixed to the tail shaft and the other of which may be slidably mounted thereon. A fluid pressure conduit extends through the tail shaft and through the fixed valve portion of the governor mechanism. The passage then terminates at a single exhaust orifice and the effective size of the orifice is regulated by the movable valve portions of the governor mechanism, said movable valve portions being actuated by centrifugal force and by a balancing fluid pressure force. The effective fluid pressure obtained in the fluid pressure passage is proportional in magnitude to the degree of restriction of the exhaust orifice, and this in turn is a function of the centrifugal force acting on the movable valve portion and the driven speed of the tail shaft. This pressure may thus be used as a governor pressure signal by the control elements of the control circuit.

For the purpose of more particularly describing my improved governor, reference may be made to the accompanying drawings wherein:

Figure 1 is a schematic representation of a multiple speed power transmission mechanism capable of embodying the improved governor of my invention;

Figure 2 is an enlarged view showing a portion of the transmission structure of Figure 1 and showing a means for mounting the valve portions of my improved mechanism on the transmission tail shaft;

Figure 3 is an enlarged subassembly view showing my improved governor in cross section and is taken along section line 3—3 of Figure 2; and Figure 4 is a view similar to Figure 3 showing a modified form of the governor assembly.

Referring first to Figure 1, numeral 10 is used to schematically designate the crankshaft for a vehicle engine which the transmission structure of Figure 1 may be used and numeral 12 similarly designates the transmission tail shaft. Crankshaft 10 may be positively connected to a pump member 14 for a multiple element hydrokinetic torque converter unit generally designated by numeral 16. The converter unit 16 further includes a primary turbine member 18 and a secondary turbine member 20, both of which cooperate with the pump member 14 to define a torus circuit in the conventional fashion. A pair of bladed reactors 22 and 24 is included within the torus circuit, the first reactor 22 being situated between the primary turbine 18 and the entrance section of the secondary turbine 20, and the second reactor 24 situated between the exit section of the secondary turbine 20 and the inlet section of the pump member 14. The reactors are mounted on one-way clutch assemblies, one of which is shown at 26. Reactor 26 in turn may be carried by a fixed reactor sleeve shaft 28, the latter being anchored to the transmission casing generally shown at 30.

The transmission mechanism further comprises a pair of compounded planetary gear units generally designated by numerals 32 and 34 and they each comprise a planetary ring gear, a sun gear and a carrier assembly. The secondary turbine member is drivably connected to the carrier assembly for the front planetary gear unit 32 and to the ring gear of the rear planetary gear unit 34. The carrier assembly for the rear planetary gear unit 34 is positively connected to a transmission tail shaft 12 and the carrier assembly for the front planetary gear unit 32 is adapted to be braked to the housing 30 by means of a brake drum 36 and a cooperating brake band 38 which encircles the drum 36 as illustrated. The sun gear for the front planetary gear unit 32 may be coupled to a torque transfer member 40 by means of a one-way clutch construction 42, said one-way clutch construction permitting the sun gear for the front planetary gear unit 32 to rotate in the direction of rotation of the turbine members while preventing rotation of the same in the opposite direction when the torque transfer member 40 is anchored.

A friction brake drum 44 may be positively connected to the member 40 and a brake band 46 surrounds the same and is adapted to anchor the member 40 to the transmission casing. The sun gear for the rear planetary gear unit 34 may be anchored by brake band 46 and by means of an overrunning brake 48, said brake 48 permitting relative rotation of the sun gear for the rear planetary gear unit 34 in the direction of rotation of the turbine members 18 and 20 when the brake band 46 is applied, but preventing rotation of the same in the opposite direction. The carrier assembly and the sun gear for the rear planetary gear unit 34 may be clutched together by a direct drive clutch 50 to lock up the rear planetary gear unit and to produce a driving torque ratio of unity in this part of the transmission structure. Also, a reverse clutch 52 is provided for drivably connecting the sun gear for the rear planetary gear unit 34 with the torque transfer member 40 to permit the delivery of a reverse driving torque through the rear planetary gear 34 during reverse drive operation.

The controls for the transmission structure above described include a front fluid pump 54 drivably coupled to the engine driven pump member 14 and a rear fluid pump 56 drivably coupled to the transmission tail shaft 12, as indicated. The controls further include the governor assembly of my instant invention which is generally designated in Figure 1 by numeral 58. The principal region of the control circuit is schematically illustrated at 60 and separate portions of the control circuit communicate with the discharge side of each of the pumps 54 and 56 through suitable passages 62 and 64 respectively. A fluid flow restriction 66 is situated in passage 64 on the upstream side of the region 60. A bypass passage 68 extends from the upstream side of the restriction 66 to passage 62 and a one-way check valve 69 is located therein as shown. The governor pressure passage 70 extends from passage 64 on the downstream side of the restriction 66 to the governor assembly 58 carried by tail shaft 12.

During operation of the transmission, a maximum overall torque multiplication ratio may be obtained by energizing brake band 46 to provide a reaction for each of the sun gears for the planetary gear units 32 and 34. A forward driving torque will then be delivered to the ring gear for the front planetary gear unit 32 thereby driving the carrier assembly of the front planetary gear unit 32 and the ring gear of the rear planetary gear unit 34. The carrier assembly for the rear planetary gear unit thus serves as a power output member and the torque reaction of the sun gear for the front planetary gear unit 32 is delivered through one-way coupling 42 to the brake band 46. Similarly, the torque reaction for the sun gear of the rear planetary gear unit 34 is delivered through one-way coupling 48 to the brake band 46.

When the speed of the primary turbine member 18 begins to increase, the speed of the secondary turbine member will also increase and a greater percentage of the torque delivered through the hydrokinetic unit 16 will be taken by the secondary turbine member 20, there being a corresponding reduction in the percentage of the total torque delivered transmitted through primary turbine member 18. At some predetermined operating condition, the torque on the turbine member 20 will be sufficient to cause a zero torque reaction on the sun gear for the front planetary gear unit 32 and the entire driving torque will be transferred directly to the ring gear for the rear planetary gear unit 34. Thereafter the entire torque multiplication ratio supplied by the gear elements of the transmission structure will be supplied by the rear planetary gear unit 34 and the front planetary gear unit 32 will be ineffective. As acceleration continues, the torque ratio produced by the hydrokinetic unit 16 approaches unity and a coupling condition is established. A direct drive ratio may then be obtained by energizing clutch 50 thereby locking up the rear planetary gear unit 34 and the torque on the turbine member 20 is thus transferred directly to the tail shaft 12.

To obtain reverse drive, brake band 36 may be applied together with clutch 52 while the brake band 46 is released. The driving torque will then be delivered from the primary turbine member 18 to the ring gear of the front planetary gear unit 32, and since the carrier assembly for the front planetary gear unit 32 is anchored by brake band 38, the sun gear for this unit will be driven in a reverse direction and this reverse motion will be transmitted through one-way clutch 42, through torque transfer member 40 and then through energized clutch 52 to the sun gear for the rear planetary gear unit 34. The ring gear for the rear planetary gear unit 34 is anchored by brake band 38 and since the sun gear for the rear planetary gear unit 34 is driven in reverse direction as above explained, the power output shaft and the carrier assembly for the rear planetary gear unit 34 will be driven in a reverse direction.

Hill braking may be obtained by simultaneously energizing clutch 52 and brake band 46 while the clutch 30 and the brake band 38 are disengaged. It is thus apparent that the secondary turbine member and the ring gear for the rear planetary gear unit 34 will be overspeeded under these conditions thereby providing a considerable degree of engine braking. A second engine braking stage may be obtained by de-energizing brake band 46 and by energizing brake band 48 while maintaining reverse drive clutch 52 in an energized condition. Reverse braking torque will then be delivered from the sun gear for the rear planetary gear unit 34 and through the clutches 52 and 42 to the sun gear for the front planetary gear unit 32. Since the carrier for the front planetary gear unit 32 is anchored, the ring gear thereof and the primary turbine 18 will be driven in a reverse direction.

It is thus seen from the above description that the transmission mechanism illustrated in Figure 1 is characterized by three ratio ranges and that the transition from one range to the other takes place with a maximum degree of smoothness. The control circuit schematically illustrated in Figure 1 is capable of energizing the various clutches and brakes in the transmission mechanism to obtain the above described shift sequence. The region 60 of the control circuit may be pressurized by engine driven pump 54 and the pump 56 may serve as an auxiliary source of pressure supply during those instances when the front pump 54 is inoperative. For example, if a push start is desired, the tail shaft 12 will drive the pump 56 thereby causing the latter to pressurize passages 64 and 68. Check valve 69 is capable of accommodating the delivery of fluid pressure from the pump 56 to the region 60 under these conditions. The fluid flow restriction 66 is adapted to produce a sufficient pressure drop thereacross so that a pressure buildup on the discharge side of pump 56 may be obtained at reasonable tail shaft speeds. However, during normal operation I contemplate that the pump 56 will function primarily as a source of governor pressure and that the check valve 69 will assume a closed condition since the pressure in passage 62 under normal driving conditions will exceed the pressure in passage 64.

As previously mentioned, the governor pressure passage 70 communicates with the governor assembly 58, and as best seen in Figure 2 it extends longitudinally with respect to the tail shaft 12 and communicates with a radial passage 72. The governor assembly is comprised of a first body portion 74 having a threaded portion 76, an intermediate portion 78 and an enlarged head 80. The body portion 74 may be threadably received in a cooperating threaded opening in the tail shaft 12 and it may be formed with a single radially extending passage 82. A transverse orifice 84 may be formed in body portion 74 and it may communicate with the radial passage 82. An external sleeve 86 is slidably positioned on the intermediate portion 78 and it cooperates with the enlarged head 80 to define a pressure chamber 88, said pressure chamber being in communication with orifice 84.

The body portion 74 and the sleeve 86 may be cylindrical in form and a recess 90 may be formed in the sleeve 86 as illustrated in Figure 2. The enlarged head portion 80 cooperates with the recess 90 to provide a variable degree of communication between the pressure chamber 88 and the low pressure exhaust region on the interior of the transmission tail shaft housing, the latter being designated in Figure 2 by the symbol 30'. It will be apparent from an inspection of the drawings that the pressure in the passage 64 on the downstream side of the restriction 66 and in the passage 70 will create a radially inward pressure force on the sleeve 86 thereby tending to increase the degree of communication between orifice 84 and the exhaust region. Conversely, the centrifugal force acting on the sleeve 86 caused by rotation of the tail shaft assembly will produce a radially outward force tending to block the communication between orifice 84 and the exhaust region. A balanced condition will therefore be established whereby a controlled amount of fluid supplied by the pump 56 will be discharged into the exhaust region. The pump 56 should be of the positive displacement type and the only variable upon which the governor pressure is dependent for any given tail shaft speed is the calibration of the governor assembly 58.

It is common practice in transmission structures of this type to provide a mechanical parking brake of the pawl and ratchet type for locking the transmission tail shaft to the transmission housing while the vehicle is parked. In the instant case such a pawl and ratchet mechanism is shown at 92 and 94. The component 94 comprises a lever pivotally mounted on a shaft 96 within the transmission housing structure and it includes a ratchet adapted to engage external teeth formed on the circular ratchet member 92, the latter being splined to the power output tail shaft 12 as indicated. When the ratchet teeth of the pawl are moved into engagement with the ratchet 92, relative rotation of the tail shaft 12 with respect to the housing is prevented. I contemplate that the ratchet member 92 will serve as a counter-balance for the governor assembly 58, and for this reason the member 92 may be recessed as shown at 98 so that the maximum concentration of the mass of the ratchet member 92 is located 180° out of position with respect to the governor assembly 58.

According to another embodiment of my invention, I contemplate that the governor assembly 58 may be used with a governor housing or casting which surrounds the tail shaft 12. Such an arrangement is illustrated in Figure 4 and the governor casting is designated by numeral 100. In this instance a suitable counter-balance weight may be formed as part of the casting 100 on one side of the shaft 12 opposite from the governor mechanism 58. Such an arrangement may be employed in those instances when the use of a transmission parking pawl and ratchet is not desired.

It may be seen from Figure 4 that the casting 100 may be formed with a flat surface 102 on one side thereof and a mounting plate 104 may be secured to the surface 102 by suitable bolts 106. The governor assembly 58 may then be secured to the mounting plate 104 by a suitable threaded connection as illustrated, said connection being similar to the connection above described between the governor assembly 58 and the tail shaft 12. The casting 100 and the mounting plate 104 may be provided with suitable passages which align with the above described passages 72 and 82 to permit fluid pressure to be transferred to the pressure regulating portions of the mechanism 58.

What I claim and desire to secure by U.S. Letters Patent is:

1. In a multiple speed power transmission mechanism for delivering power from a driving member to a driven shaft and including an automatic control circuit for regulating changes in the effective transmission torque multiplication ratio; a speed governor forming a portion of said control circuit and comprising a fluid pressure pump drivably coupled to said driven shaft, a governor valve member secured to said shaft and having radially spaced portions with differential diameters, a governor valve sleeve slidably carried on said valve member in telescopic relationship with respect to the same, said sleeve having portions of differential internal diameters which cooperate with the spaced portions of said valve member, an exhaust passage formed in said valve member, and a fluid pressure passage extending from the discharge side of said pump to said exhaust passage including communicating portions formed in said driven shaft and in said valve member, said valve member and said valve sleeve defining a pressure cavity communicating with said exhaust passage whereby a fluid pressure force is caused to act on said valve sleeve to oppose and balance said centrifugal force during operation, said valve sleeve being urged in a radially outward direction by centrifugal force toward an exhaust passage closing position, the cooperating portions of said valve member and said valve sleeve defining an annular valve opening to provide a regulated degree of communication between a surrounding exhaust region and said pressure cavity.

2. In a multiple speed power transmission mechanism for delivering power from a driving member to a driven shaft, said transmission including a locking means for locking said driven shaft against rotation including a circular locking member carried by said driven shaft; an automatic control circuit for regulating changes in the effective transmission torque multiplication ratio including a speed governor forming a portion of said control circuit and comprising a fluid pressure pump drivably coupled to said driven shaft, a governor valve member secured to one side of said shaft and including two cylindrical portions of different diameters, a governor valve sleeve slidably carried by said valve member in telescopic reltaionship with respect to the same and including sections of differential internal diameter for cooperating respectively with the different diameter portions of said valve member, an exhaust passage formed in said valve member, and a fluid pressure passage extending from the discharge side of said pump to said exhaust passage including communicating portions formed in said driven shaft and in said valve member, said valve sleeve being urged in a radially outward direction by centrifugal force toward an exhaust passage closing position, said valve member and said valve sleeve defining a pressure cavity communicating with said exhaust passage whereby the fluid pressure force is caused to act on said valve sleeve to oppose and balance said centrifugal force during operation, said locking member having a center of mass located 180° out of position with respect to said valve member and sleeve thereby forming a counterweight for the latter.

3. In a multiple speed power transmission mechanism for delivering power from a driving member to a driven shaft and including a control mechanism for regulating changes in the effective torque multiplication ratio; a speed governor valve mechanism forming a part of said control mechanism and adapted to produce a modulated speed sensitive pressure, a fluid pressure pump drivably connected to said driven shaft, a pair of telescopically related valve members drivably connected to said driven shaft and adapted to rotate conjointly therewith about an axis of revolution, a separate valve land formed on each valve member, said valve lands partly defining an exhaust port, one valve land being relatively movable over the other, a fluid pressure passage including a first portion extending from said fluid pump to said exhaust port and a second portion extending to speed sensitive parts of said control mechanism, one of said members being adapted to move radially outward from said axis of rotation relative to the other under the influence of centrifugal force during operation and to variably restrict the degree of communication between said pump and said exhaust port, and a fluid flow restriction located in said first passage portion between said exhaust port and said second passage portion, the centrifugal force being opposed and balanced by the fluid pressure force acting on said one member.

4. In a multiple speed ratio power transmission mechanism for delivering power from a driving member to a driven shaft and including a control mechanism for controlling shifts from one transmission speed ratio to another; a speed governor mechanism comprising a pair of valve members drivably connected to said driven shaft, one valve member being carried by the other and defining therewith a fluid pressure chamber, a fluid pressure source, passage means for providing continuous communication between said pressure source and said chamber, said valve members including cooperating valve lands defining an exhaust passage for said chamber, one valve land being movable relative to the other whereby said valve lands provide a variable degree of communication between said passage means and an exhaust region, said one valve member being urged radially outward from the axis of said shaft by centrifugal force against an opposing pressure force whereby the degree of restriction of said passage means increases as the speed of rotation of said driven shaft increases.

5. The combination as set forth in claim 4 wherein said passage means includes a fluid flow restriction disposed between said pressure source and said chamber.

6. In a multiple speed power transmission mechanism for delivering power from a driving member to a driven shaft and including an automatic control circuit adapted to regulate changes in the effective transmission torque multiplication ratio; a speed governor forming a part of said control circuit and comprising a fluid pressure pump drivably coupled to said driven shaft, a first governor valve member secured to one side of said shaft with the axis thereof extending transversely with respect to the axis of said driven shaft, a second valve member slidably carried by said first valve member in telescopic relationship to the same, an exhaust passage formed in said first valve member, said exhaust passage communicating with a low pressure exhaust region and a governor pressure passage extending from the discharge side of said pump to said exhaust passage, said governor pressure passage communicating with speed sensitive portions of said control circuit, said second valve member being urged in a radially outward direction toward an exhaust passage closing position by centrifugal force produced during operation against an opposed fluid pressure force produced by the fluid pressure in said governor pressure passage.

7. In a multiple speed power transmission mechanism for delivering power from a driving member to a driven shaft and including a control mechanism for regulating changes in the effective torque multiplication ratio; a speed governor valve mechanism forming a part of said control mechanism and adapted to produce a modulated speed sensitive pressure, a source of fluid pressure, a pair of telescopically related valve members drivably connected to said driving shaft and adapted to rotate conjointly therewith about an axis of revolution, a separate valve land formed on each valve member, said valve lands partly defining an exhaust port, said exhaust port communicating with an exhaust region, one valve land being relatively movable over the other, a first fluid pressure passage extending from said pressure source to said exhaust port, a second fluid pressure passage extending from said first fluid pressure passage to speed sensitive parts of said control mechanism, one of said valve members being adapted to move radially outward from the axis of rotation of said driven shaft relative to the other under the influence of centrifugal force during operation and to variably restrict the degree of communication between said pressure source and said exhaust port, the centrifugal force being opposed and balanced by the centrifugal pressure acting on said one member.

References Cited in the file of this patent

UNITED STATES PATENTS

| | | |
|---|---|---|
| 1,422,633 | Sterrett | July 11, 1922 |
| 2,667,085 | Ackerman | Jan. 26, 1954 |
| 2,694,948 | McFarland | Nov. 23, 1954 |
| 2,707,887 | Slack | May 10, 1955 |
| 2,738,650 | McAfee | Mar. 20, 1956 |
| 2,770,148 | Wayman | Nov. 13, 1956 |

FOREIGN PATENTS

| | | |
|---|---|---|
| 81,517 | Switzerland | June 16, 1918 |